No. 881,931. PATENTED MAR. 17, 1908.
J. H. KAUFFMAN.
BAND CUTTER AND FEEDER.
APPLICATION FILED APR. 21, 1906.
3 SHEETS—SHEET 3.
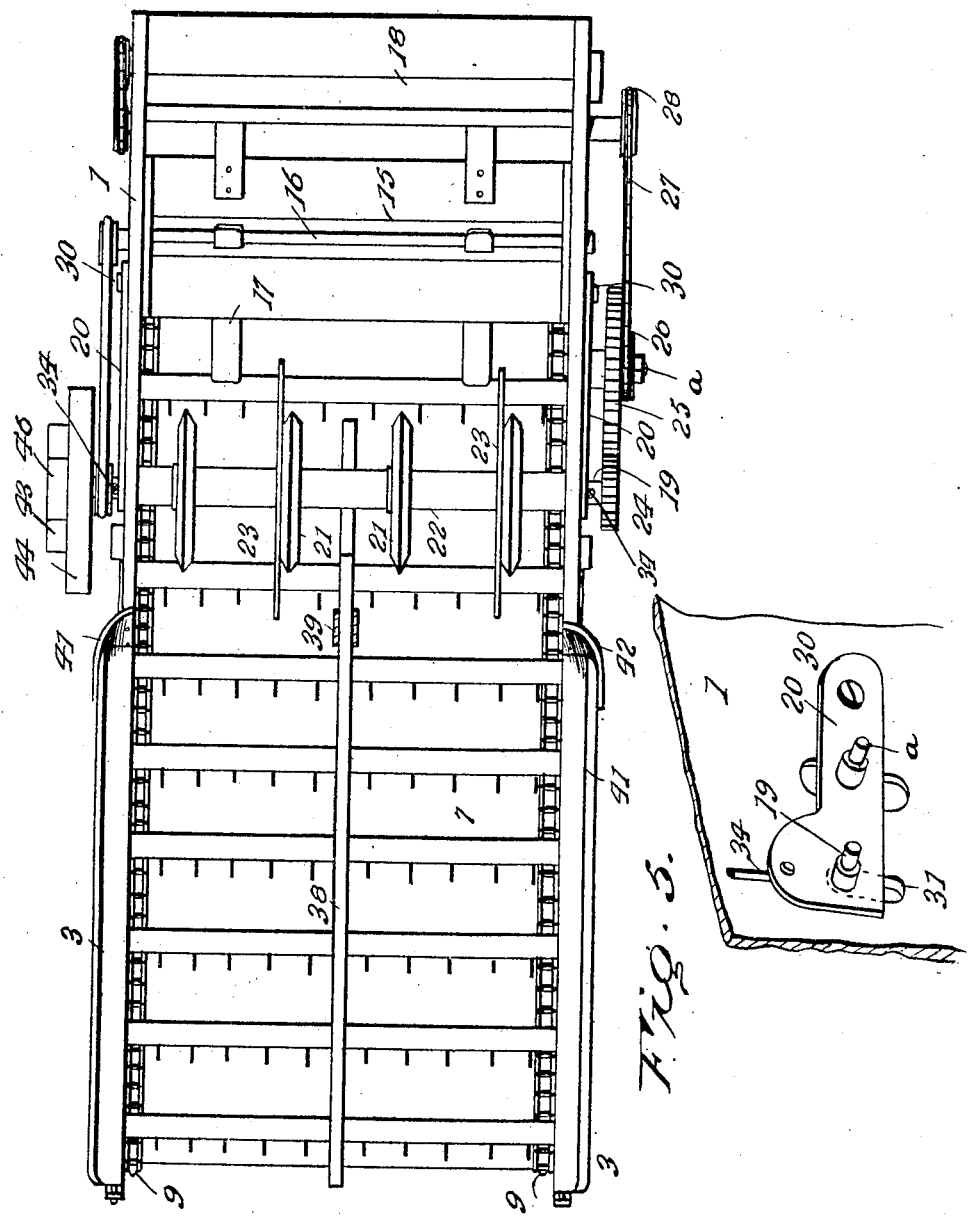
Witnesses
Inventor
J. H. Kauffman
By
Lacey, Attorneys

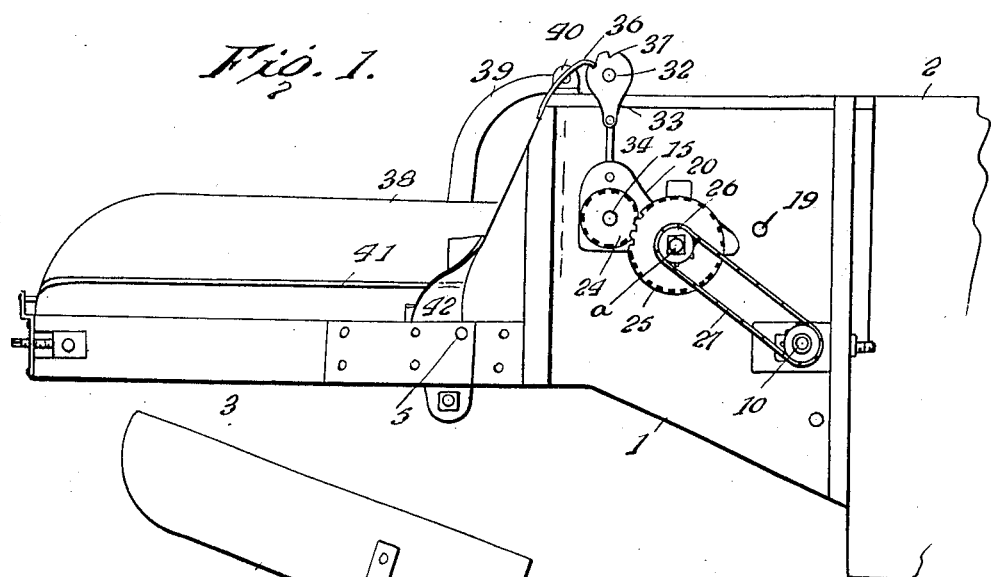

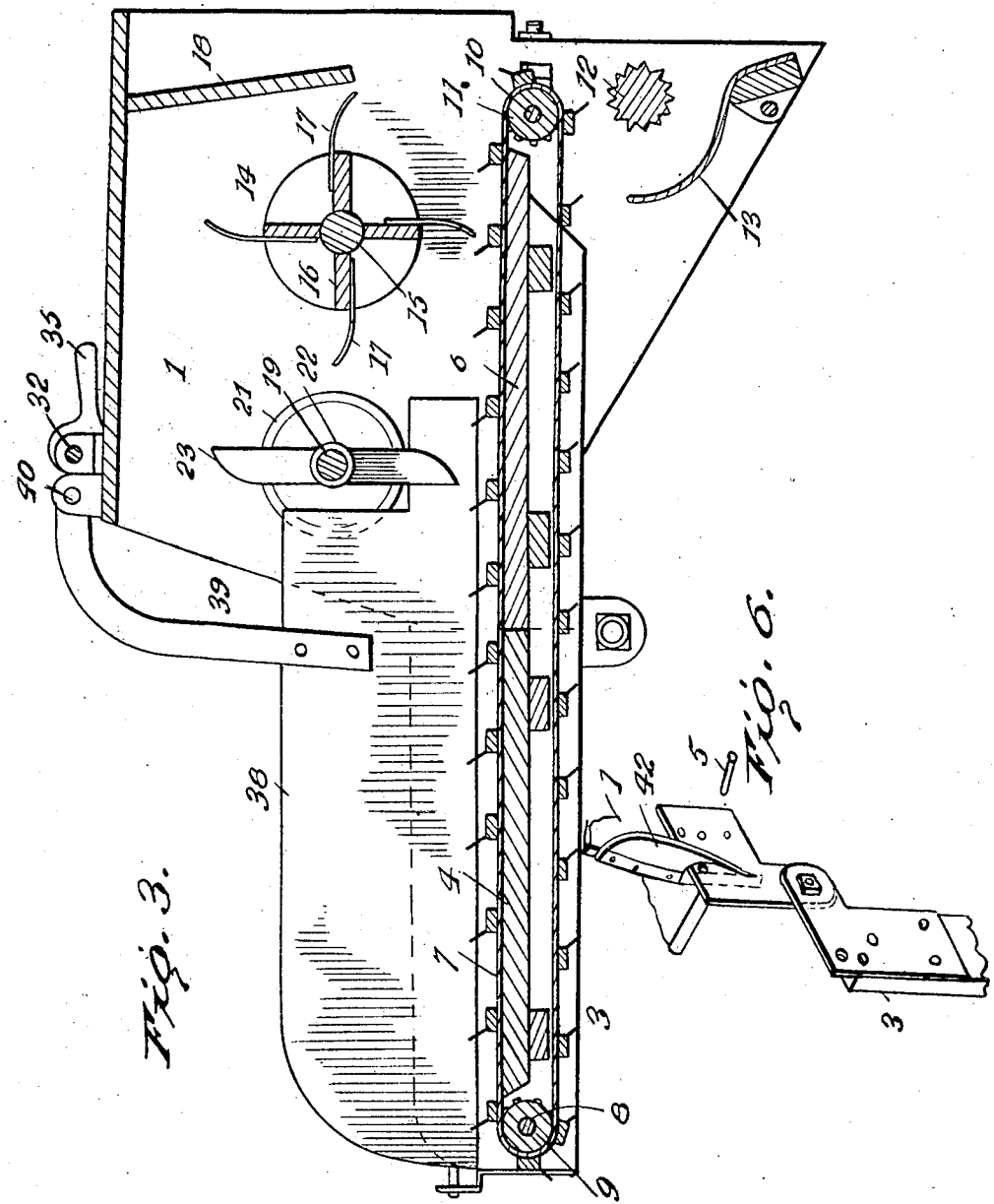

UNITED STATES PATENT OFFICE.

JEROME H. KAUFFMAN, OF HOPE, KANSAS.

BAND-CUTTER AND FEEDER.

No. 881,931.

Specification of Letters Patent.

Patented March 17, 1908.

Application filed April 21, 1906. Serial No. 313,075.

*To all whom it may concern:*

Be it known that I, JEROME H. KAUFFMAN, citizen of the United States, residing at Hope, in the county of Dickinson and State of Kansas, have invented certain new and useful Improvements in Band-Cutters and Feeders, of which the following is a specification.

This invention aims to devise an appliance of novel structure which will economize space and material and enable a close fit being had between the attachment and the thresher to which it is fitted, said appliance being so formed as to admit of the projecting parts being folded to admit of compact arrangement for storing or transportation so that the thresher with the attachment in position may pass through the usual opening provided in an inclosure or farm fence.
The invention also has for its object to improve the general structure of devices of the character aforesaid and to make provision for adjustment of the band cutting mechanism without requiring a stoppage of the machine, thereby adapting the same for bundle or headed grain according to whichever is supplied to be fed to the thresher.

A further purpose of the invention is to simplify the general structure and to combine the parts in a novel manner, whereby repairs may be more cheaply and quickly effected and whereby access to the working parts is greatly facilitated both for inspection, cleaning, oiling and the like.
For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of a band cutter and feeder embodying the invention, showing the same applied to a threshing machine. Fig. 2 is a view similar to Fig. 1 of the attachment as seen from the reverse side. Fig. 3 is a vertical central longitudinal section of the attachment and a portion of the thresher.
Fig. 4 is a top plan view of the band cutter and feeder, the top of the inclosed framing omitted. Fig. 5 is a detail view showing more clearly the manner of mounting the band cutting mechanism to admit of its vertical adjustment, the dotted lines showing an adjusted position of the band cutting mechanism. Fig. 6 is a detail perspective view of the hinged or pivoted ends of the bundle carrier showing the means for attaining a close joint when said parts are in alinement as when the bundle carrier is in working position.

Corresponding and like parts are referred to in the following description and indicated in all the views of the drawings by the same reference characters.

The attachment comprises a framework 1 which is closed at the top and opposite sides and which is adapted to be secured in any manner to the framework of the thresher 2.
The bundle carrier is located at the lower portion of the framework 1 and comprises a relatively fixed section and a hinged or pivoted section, the latter being adapted to fold beneath the framework 1 and the fixed section to admit of reducing the length of the attachment, whereby it is reduced to a compact form both for housing and transportation.

The hinged or pivoted section of the bundle carrier comprises side pieces 3 and a connecting piece 4 which forms a support for the outer portion of the endless conveyer and also serves as a tie for the side pieces 3. The inner ends of the side pieces 3 abut against the outer ends of the side pieces of the framework 1 when the hinged section of the bundle carrier is extended, thereby limiting the upward movement of the side pieces. The hinged or pivoted section is adapted to swing downward, thence upward beneath the framework 1 so as to be out of the way and materially reduce the length of the attachment Fig. 2. The hinged section may be connected to the framework 1 in any manner, preferably by means of companion plates which are attached, respectively, to the side pieces 3 and to the corresponding sides of the framework 1. When the hinged section is extended, the hinged members overlap, and a pin 5 passed through the overlapped portions of the hinged members holds the hinged section extended and in working position. A board 6 secured between the side pieces of the framework in position to aline with the connecting piece 4 forms with the latter a support for the endless conveyer. The parts 3 and 6 constitute sections of the support and transverse tie for the pieces of the hinged section and the framework, as will be readily understood.

The endless conveyer 7 may be of any construction commonly employed in agricultural and milling machinery, and as illustrated comprises sprocket chains, connecting slats or bars, and an apron or web, the latter being attached at its longitudinal edges to the chains and intermediate of its edges to the slats or bars. Teeth project from the slats or bars and incline upwardly and rearwardly and are of a length to engage with the grain and feed the same positively to the threshing mechanism. A shaft 8 is mounted in its bearings at the outer ends of the side pieces 3 and is provided near its ends with pulleys 9 forming supports for the outer ends of the endless chains of the conveyer 7. A corresponding shaft 10 is mounted in bearings having adjustable connection with the side pieces of the framework 1 near their outer ends and sprocket pulleys 11 fast upon the shaft 10 support inner ends of the endless chains of the conveyer 7. By proper adjustment of the bearings supporting the shaft 10, the inner end of the conveyer 7 may be moved closer to or farther from the thresher as the nature of the work may demand.

A corrugated roller 12 is arranged below the delivery end of the conveyer 7 and is adapted to detach any grain that may tend to adhere thereto and prevent the same being carried away from the thresher. The ribs formed by the corrugations serve to detach any grain that may adhere to the conveyer to cause the same to enter the thresher. The corrugated roller is driven so that its upper portion moves towards the thresher and for convenience it is geared to the shaft 10. A guard 13 forming a protector for the corrugated roller 12 extends beneath said roller and in the rear thereof and serves to catch any loose grain and direct the same into the thresher. This guard preferably consists of a metal plate curved intermediate of its edges and having an edge portion fast to a bar which is secured at its ends to the side pieces of the framework 1 in a way to admit of the guard being easily and quickly removed when it is required, from any cause, to gain access to the thresher either for removing the sections of the concave or for any other purpose.

A beater 14 is arranged above the delivery end of the bundle carrier and is mounted to rotate and comprises a shaft 15, wings 16 and teeth 17. The wings 16 are connected at their ends by disks and the teeth 17 have an arrangement to prevent a too rapid feed of the grain to the thresher. The beater is rotated so that its lower portion travels in the same direction as the conveyer 7, thereby coöperating therewith to effect positive feed of the grain. The shaft 15 is preferably geared to the shaft 10. A baffle plate 18 is located in rear of the rotary beater and prevents said beater throwing any grain upward and rearward.

The band cutter mechanism comprises a shaft 19 which is mounted near its ends in movable bearings 20, disks 21 fast to the shaft 19 and separated by spacing sleeves 22, and blades 23 attached to the disks 21 or forming a part of said disks. The blades 23 project from the shaft at different angles, whereby they come inot play successively, said blades being arranged along the shaft 19 to insure separation or cutting of the band by means of which the grain is bound into bundles. The power for driving the operating mechanism of the band cutter and feeder is applied to the shaft 19 and transmitted therefrom to the rotary beater, endless conveyer and corrugated roller in the manner substantially as shown. A spur gear 24 fast to one end of the shaft 19 is in mesh with a spur gear 25 loose upon a stub shaft $a$ extended from the adjacent movable bearing 20 and provided upon its side with a spur gear 26 which is connected by sprocket chain 27 with a spur gear 28 fast to an end of the shaft 10. The spur gears 25 and 26 rotate as one part and may be formed or connected in any manner and act in the capacity of an idler to transmit motion from the shaft 19 to the shaft 10. The stub shaft $a$ carrying the twin idler 25 and 26 being movable with the bearing 20 insures meshing relation of the spur gears 24 and 25 at all stages of adjustment of the cutting mechanism.

The bearings 20 may be of any construction and consist of plates or arms pivoted at one end, as at 30, to the framework 1 and receiving the shaft 19 at their opposite ends. The end portions of the shaft 19 pass through slots 31 in the sides of the framework 1. For adjusting the band cutting mechanism the following means have been devised, namely, shaft 32 mounted in bearings upon the framework 1, arms 33 at the ends of the shaft 32, links 34 connecting the arms 33 with the bearings 20 and a lever 35, the latter extending from one of the arms 33. To hold the band cutting mechanism in the required position, a pawl 36 coöperates with stops 37, the latter being formed upon an edge of an arm 33. By this means the band cutting mechanism may be adapted either for bundled or headed grain, as may be required. A divider 38 is arranged above the bundle carrier and prevents the bundles from turning so as to occupy a position cross-wise or slant-wise of the said bundle carrier. The divider is supported at its inner end by means of a curved arm 39 which is attached at its lower end to the divider and is pivoted at its upper end to the top of the framework 1. When the divider is lowered into position, the curved portion of the arm 39 rests upon the top of the framework 1 and forms a rigid support for the divider. The inner end of the divider extends beneath the shaft of the band cutting mechanism and slightly forward thereof. The arm 39 is pivotally connected to brackets 30 attached to the top of the framework, hence the divider may be thrown upward and rearward so as to rest upon the framework to be out of the way when the hinged section of the bundle carrier is folded to reduce the length of the appliance.

Guards 41 are fitted to the side pieces 3 of the hinge section and are diverged and serve to retain the bundles when delivered upon the carrier. The inner ends of the guards 41 are beveled to make a close joint with wings 42 attached to the rear edges of the side pieces of the framework 1. The wings 42 are tapered and are curved outward and rearward to embrace the beveled ends of the guards 41 and form a close joint therewith. The wings 42, by reason of their flare, prevent the formation of abrupt shoulders at the juncture of the hinged section of the bundle carrier or the fixed section of the framework 1 and serves to direct the bundles past the joint with a minimum amount of resistance or obstruction.

A pulley 43 is fast to the shaft 19 and a coöperating pulley 44 loose upon the shaft 19 is provided with pivoted governor arms 45 weighted at one end and provided with shoes 46 at the opposite end to grip the pulley 43 when the band pulley 44 attains a given speed to cause the weighted ends of the governor arms 45 to move outward and their opposite ends to correspondingly move inward to cause the shoe 46 to grip the pulley 43 with sufficient force to cause rotation of the shaft 19 and the parts dependent thereon for movement. Power may be imparted to the band pulley 44 from any driven part of the thresher or from other source of motive power. The beater 14 is preferably driven from the shaft 19 of the band cutting mechanism by means of a sprocket chain and sprocket gears, the latter being fast to the respective shafts 15 and 19.

When the band cutter and feeder is attached to a thresher and the bundle carrier extended and the parts set in motion, bundles placed upon the conveyer 7 are advanced thereby to the thresher, the bands being severed by the cutting mechanism and the action of the conveyer being supplemented by the rotary beater. In the event of the speed of the band pulley 44 falling below the normal, the weighted ends of the governor arms will move inward and admit of the grip of said governor arms upon the pulley 43 becoming relaxed to such an extent as to throw the band cutter and feeder out of action and upon the band pulley 44 attaining the predetermined speed, the band cutter and feeder will be automatically thrown into action. When it is required to move the thresher with the attachment in position or to store said thresher, the divider is thrown upward and forward upon the framework 1 and the hinged section of the bundle carrier is folded against the lower side of said framework, as will be readily understood.

Having thus described the invention, what is claimed as new is:

1. In a band cutter and feeder, the combination of a frame-work, a bundle carrier, swinging plates mounted upon opposite sides of the frame-work, a shaft journaled between the swinging plates, band cutters connected with the shaft, a stub shaft carried by one of the swinging plates, an idler mounted upon the stub shaft, means for transmitting motion from the idler to the shaft, means for transmitting motion from the idler to the bundle carrier, and means for adjusting the swinging plates to properly position the cutting mechanism.

2. In a band cutter and feeder, the combination of a frame-work, a bundle carrier, swinging plates mounted upon opposite sides of the frame-work, a shaft journaled between the swinging plates, a stub shaft carried by one of the plates, a shaft journaled between the swinging plates, band cutters connected with the shaft, a gear wheel rigid with the shaft, a second gear wheel loosely mounted upon the stub shaft and meshing with the before mentioned gear wheel, and means for transmitting motion from the second mentioned gear wheel to the bundle carrier.

3. In a band cutter and feeder, the combination of a frame-work, a bundle carrier mounted upon the frame-work, swinging plates applied to opposite sides of the frame-work, a stub shaft carried by one of the swinging plates, a shaft journaled between the swinging plates, band cutters connected with the shaft, a gear wheel rigid with the shaft, a second gear wheel loosely mounted upon the stub shaft and meshing with the first mentioned gear wheel, a spur gear rigid with the second mentioned gear wheel, and means for transmitting motion from the spur wheel to the bundle carrier.

In testimony whereof I affix my signature in presence of two witnesses.

JEROME H. KAUFFMAN. [L. S.]

Witnesses:
 B. A. FLACK,
 C. H. GAUMER.